Nov. 15, 1966 D. CLEJAN 3,285,194
COMBINATION RAILWAY AND PASSENGER AUTOMOBILE
TRANSPORTATION SYSTEMS
Filed Oct. 8, 1963 4 Sheets-Sheet 3

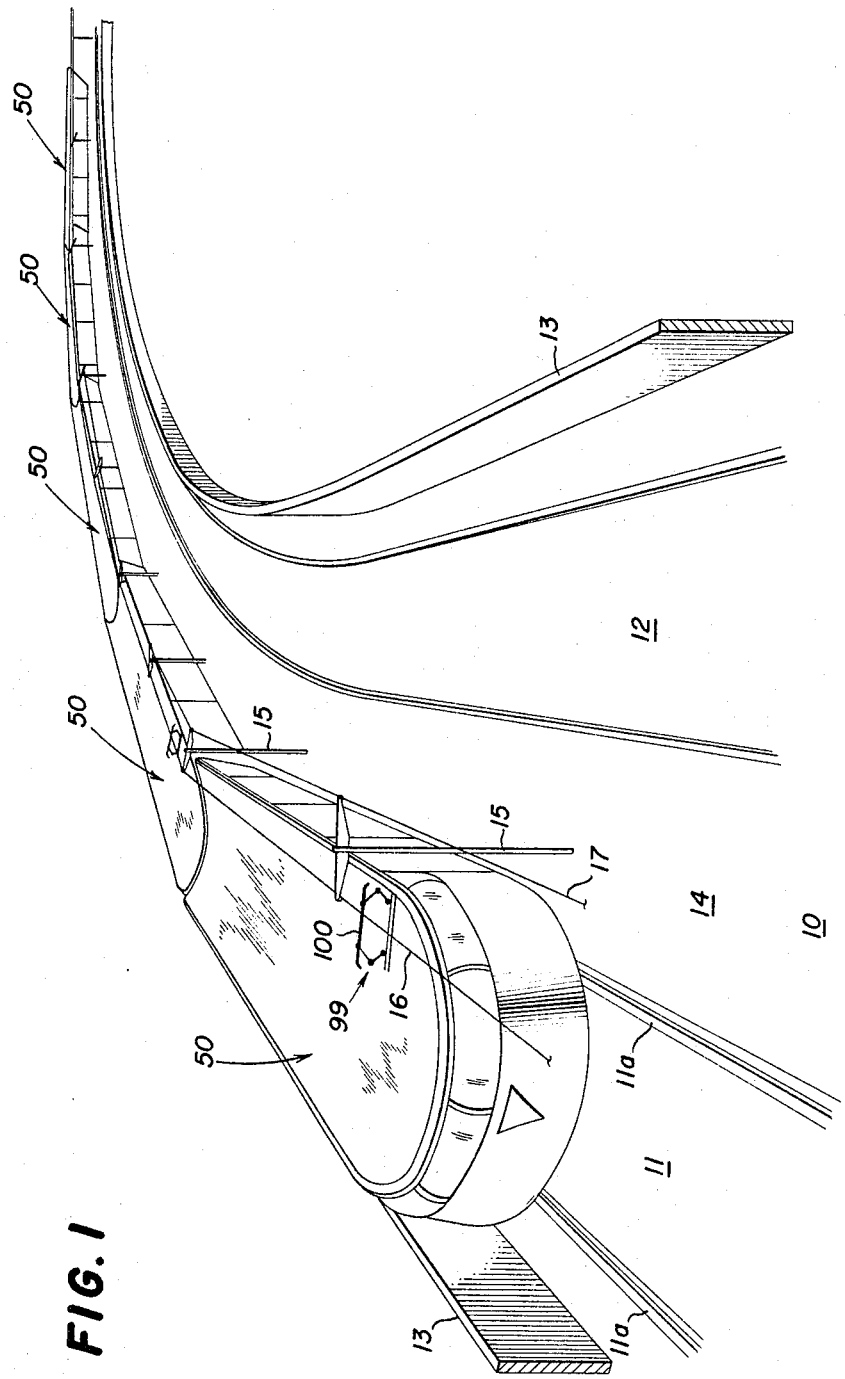

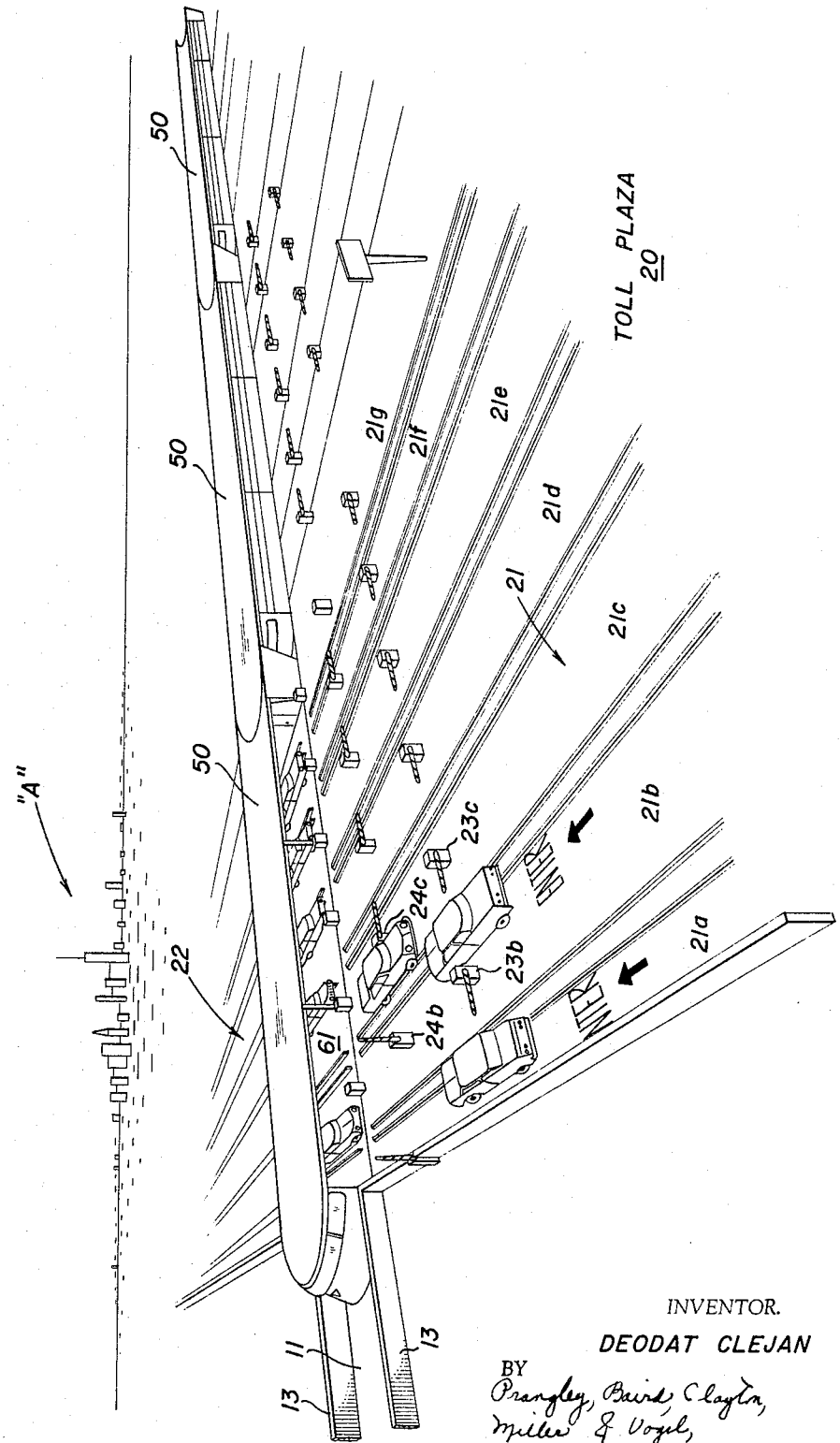

INVENTOR.
DEODAT CLEJAN
BY
ATTYS.

Nov. 15, 1966 D. CLEJAN 3,285,194
COMBINATION RAILWAY AND PASSENGER AUTOMOBILE
TRANSPORTATION SYSTEMS
Filed Oct. 8, 1963 4 Sheets-Sheet 4

INVENTOR.
DEODAT CLEJAN
BY
Prangley Baird Clayton
Miller & Vogel,
ATTYS.

United States Patent Office 3,285,194
Patented Nov. 15, 1966

3,285,194
COMBINATION RAILWAY AND PASSENGER
AUTOMOBILE TRANSPORTATION SYSTEMS
Deodat Clejan, Chicago, Ill., assignor to General American Transportation Corporation, Chicago, Ill., a corporation of New York
Filed Oct. 8, 1963, Ser. No. 314,779
13 Claims. (Cl. 104—27)

The present invention relates to combination railway and passenger automobile transportation systems, and more particularly to such systems employing railway motor cars that are especially designed to transport both passenger automobiles and the passengers thereof.

It is a general object of the invention to provide a combination railway and passenger automobile transportation system that comprises one or more toll plazas, an interconnecting stretch of railway track of wide gauge of at least about 10 feet, and a railway motor car that runs at high speed on the stretch of railway track and relative to the one or more toll plazas, wherein the railway motor car is especially adapted to transport a plurality of passenger automobiles and the passengers thereof, and wherein the passenger automobiles are driven onto and off-of the railway motor car at the one or more toll plazas.

Another object of the invention is to provide a transportation system of the character described, wherein the car comprises an elongated longitudinally extending substantially box-like body including a substantially horizontal floor and a generally horizontal roof and a pair of upstanding end walls, wherein the floor has a length of at least about 100 feet and a width of at least about 20 feet, and wherein wide doorway openings are provided at the opposite sides of the body, so that the dimensions of the floor are adequate to accommodate the simultaneous support and storage thereupon of a substantial number of passenger automobiles extending laterally thereof and disposed in side-by-side relation with each other, and so that the passenger automobiles may be driven onto and off-of the floor through the wide doorway openings provided at the opposite sides of the body.

Another object of the invention is to provide a transportation system of the character described, wherein the doorways provided on each side of the body of the car are defined by a plurality of longitudinally spaced-apart upstanding posts, each post joining the floor at the bottom thereof and joining the roof at the top thereof, and further comprising doors respectively cooperating with the doorways, each door being selectively movable between open and closed positions with respect to the associated doorway.

Another object of the invention is to provide a transportation system of the character described, wherein the car doors are of the overhead suspension type, wherein each door in its closed position occupies an upstanding attitude in the associated doorway and in its open position occupies a substantially horizontal attitude disposed closely adjacent to and below the roof.

A further object of the invention is to provide a transportation system of the character described, wherein each of the car doorways has a width of at least about 16 feet, and each of the doors is selectively moved between its open and closed positions by associated electric motor means, so that all of the doors may be quickly moved between their open and closed positions, as required, in loading and unloading the floor, when the car occupies its stop position at one of the toll plazas.

A further object of the invention is to provide a transportation system of the character described, wherein the width of the car floor is adequate to accommodate the provision of a passenger aisle between the opposite ends thereof, when the passenger automobiles occupy their loaded positions thereon with respective ends thereof disposed closely adjacent to one side of the floor, whereby the passenger aisle is defined adjacent to the other side of the floor.

A further object of the invention is to provide a transportation system of the character described, wherein the right-of-way is electrified, whereby the railway motor car is of the electric type, so that the wheels thereof are driven by electric traction motors, in order to minimize noise in the operation of the car and to render unnecessary the carrying thereby of a source of fuel and other auxiliary equipment characteristic of steam and diesel propulsion locomotives.

Yet another object of the invention is to provide a transportation system of the character described, wherein the front end of the body of the car has an outwardly convex configuration and the rear end of the body has an inwardly concave configuration, whereby the arrangement accommodates operation of a train of the cars in tandem relation, whereby the front end of a trailing car is nested into the rear end of a leading car, thereby greatly to minimize wind-resistance to high speed travel of the train of coupled cars.

Further features of the invention pertain to the particular arrangement of the elements of the combination railway and passenger automobile transportation system, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a front perspective view of a portion of a combination railway and passenger automobile transportation system and embodying the present invention;

FIG. 2 is a front perspective view of another portion of the system;

FIG. 3 is a side elevational view of one of the railway motor cars employed in the system of FIGS. 1 and 2, and also embodying the present invention;

FIG. 4 is a horizontal sectional view of the car, this view being taken in the direction of the arrows along the line 4—4 in FIG. 3;

Figure 5:
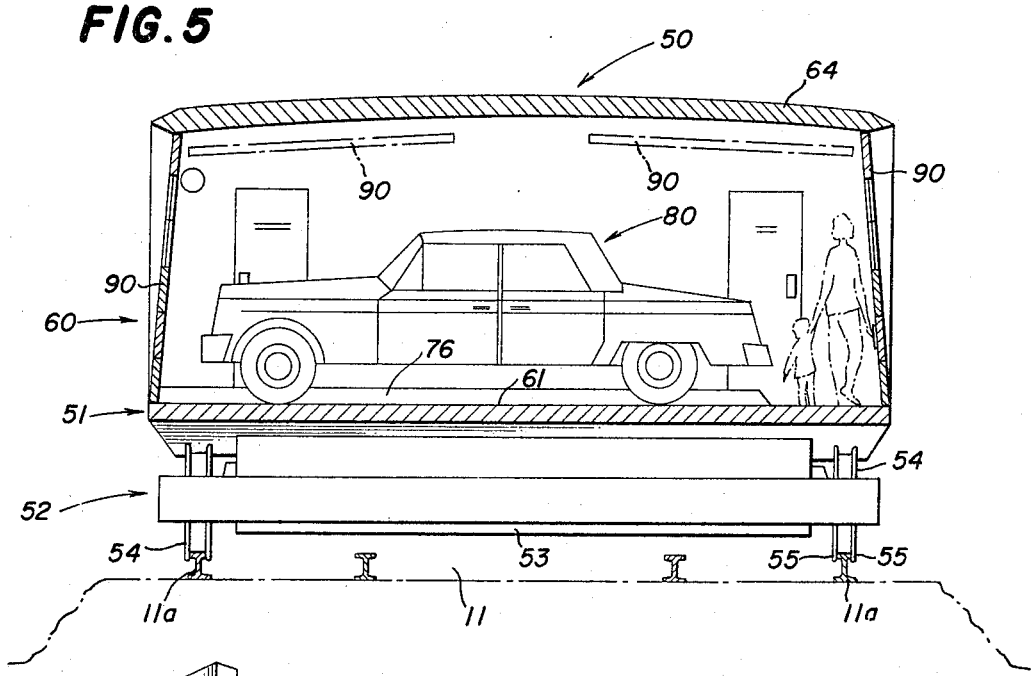
FIG. 5 is an enlarged lateral vertical sectional view of the car, this view being taken in the direction of the arrows along the line 5—5 in FIG. 4.

Referring now to FIGS. 1 and 2, the combination railway and passenger automobile transportation system there illustrated, and embodying the features of the present invention, essentially comprises a railway right-of-way 10, preferably of the double-track type, including a first stretch of railway track 11 for traffic in one direction and a second stretch of railway track 12 for traffic in the opposite direction. Also, the system includes at least two toll plazas, one of which is illustrated at 20 in FIG. 2. Each of the railway tracks 11 and 12 is of the same exceedingly wide gauge of at least 10 feet and preferably of about 17 feet, as illustrated; and the right-of-way 10 is arranged so that it does not intersect any other railway track or highway at grade level, with the result that it is especially designed for high-speed traffic, up to speeds as high as 200 miles per hour. In order further to avoid any possible obstruction of the tracks 11 and 12, preferably the opposite sides of the right-of-way 10 is fenced, as indicated at 13.

In the arrangement, it is contemplated that the system will serve two or more metropolitan areas, and that the two toll plazas 20 mentioned will be arranged outside of the two respectively adjacent metropolitan areas and respectively connected thereto by highways. Of course, the right-of-way 10 interconnects the two toll plazas 20; and in the system high-speed railway traffic is maintained over the tracks 11 and 12 between the two toll plazas 20, and preferably on a schedule involving movement of a railway vehicle in either direction at least every 5 minutes during heavy morning and evening traffic periods. Further, the system comprises a plurality of railway motor cars 50, that may be run individually or in coupled trains, as traffic conditions require. Preferably, the right-of-way 10 is electrified; whereby each of the motor cars 50 is of the electric propulsion type.

As illustrated, the two tracks 11 and 12 are respectively positioned on opposite sides of an intermediate clearance strip 14 located substantially centrally of the right-of-way 10; which strip 14 carries a plurality of spaced-apart upstanding poles 15 that carry two overhead electric power supply systems 16 and 17 respectively serving the two tracks 11 and 12.

Before proceeding with further description of the system, it is well to consider the construction and arrangement of the railway motor cars 50 that are preferably substantially identical to each other. Specifically, the motor car 50 comprises, as best shown in FIGS. 3, 4 and 5, an elongated longitudinally extending rigid underframe 51, of any suitable construction, and an elongated longitudinally extending body 60 carried by the underframe 51. The underframe 51 is of substantially rectangular configuration having a length of at least about 100 feet and a width of at least about 20 feet; and as illustrated, the underframe 51 has a length of about 130 feet and a width of about 23 feet. The underframe 51 is supported adjacent to the opposite ends there by two electric motor driven bogies 52, as best shown in FIGS. 3 and 5, each of the bogies 52 may comprise four axles, three of which may be driven by three respectively associated electric traction motors 53 through suitable gearing; all in a conventional manner. In this case, the motor car 50 may be classified in accordance with the Whyte system as 1Co–Co1. Of course, the axles of the bogies 52 carry wheels 54 that engage the heads of the rails 11a of the track 11; and, preferably, the opposite sides of each wheel 54 carry a pair of flanges 55 respectively disposed on opposite sides of the engaged head of the adjacent rail 11a, as best shown in FIG. 5. This arrangement insures proper tracking by the wheels 54 of the rails 11a on curves in the track 11, when the car 50 is traveling at high speed.

The body 60 is of box-like configuration including a substantially rectangular floor 61 rigidly secured in place directly upon the top of the underframe 54, a front end wall 62, a rear end wall 63 and a roof 64. The top of the floor 61 is supported in a substantially horizontal lower plane disposed about 4 feet 6 inches above the heads of the track rails 11a, and the dimensions of the floor 61 are substantially commensurate with that of the underframe 51 positioned immediately therebelow. The front end wall 62 is disposed in upstanding position and joins the front end of the floor 61 and the front end of the roof 64; similarly, the rear end wall 63 is disposed in upstanding position and joins the rear end of the floor 61 and the rear end of the roof 64; and the top of the roof 64 is disposed in a generally horizontal upper plane positioned about 9 feet above the top of the floor 61. The front end wall 62 has an outwardly convex configuration to minimize wind resistance to forward travel of the coach 50; and the front portion of the roof 64 is curved downwardly to join the top of the front end wall 62 for a similar purpose. The roof 64 is also slightly crowned along the longitudinal center-line thereof and downwardly toward the opposite longitudinal eaves thereof for the usual water-shed purpose. The rear end wall 63 is of composite configuration, including an inwardly concave central section 63a and a pair of longitudinally extending and laterally spaced-apart side sections 63b respectively disposed at the opposite rear sides of the floor 61.

The front end of the underframe 51 carries a centrally disposed front coupler 56; and the rear end of the underframe 51 carries a centrally disposed rear coupler 57. The couplers 56 and 57 are of any conventional construction and are matched; whereby the front end of a trailing motor car 50 may be coupled to the rear end of a leading motor car 50 via the couplers 56 and 57, so as to accommodate the make-up of a train comprising any suitable number of the motor cars 50, as illustrated in FIGS. 1 and 2, and in a conventional manner. The configurations of the front end wall 62 and the central section 63a of the rear end wall 63 are substantially complementary; whereby the front end wall 62 of the trailing motor car 50 is nested into the central section 63a of the rear wall 63 of the leading motor car 50, when two of the motor cars 50 are coupled together to make-up a train. This arrangement is very advantageous as it further reduces wind-resistance to high-speed travel of the train. Also, the rear end of the roof 64 of the leading motor car 50 is disposed slightly higher than the front end of the roof 64 of the trailing motor car 50, so as further to reduce wind-resistance to high-speed travel of the train.

Referring again to FIGS. 3 and 4, it is noted that an upstanding curved partition wall 65 is arranged rearwardly of the front end wall 62 and between the floor 61 and the roof 64 and cooperative therewith to define a passenger compartment 66 therebetween and located in the extreme front end of the body 60. Another upstanding partition wall 67 is arranged rearwardly of the partition wall 65 and between the floor 61 and the roof 64 and cooperates therewith to define a passenger lounge 68 in the front end of the body 60 and positioned immediately behind the passenger compartment 66. Also it is mentioned that the front end wall 62 includes substantial wall structure, indicated at 62a, that is formed of transparent material, such as glass, so as to afford persons in the passenger compartment an unobstructed view of the track 11 and the adjacent forwardly disposed scenery. Further, upstanding partition walls, indicated generally at 69, are arranged forwardly of the rear end wall 63 and between the floor 61 and the roof 64 and cooperate therewith to define two laterally spaced-apart passenger rest rooms 70 and 71 in the extreme rear end of the body 60.

The rear portions of the front end wall 62 are respectively joined to a pair of laterally spaced-apart upstanding front posts 72 respectively disposed at the opposite sides of the floor 61; and the front portions of the side sections 63b of the rear wall 63 are respectively joined to a pair of laterally spaced-apart upstanding rear posts 73 respectively disposed at the opposite side of the floor 61. The pair of posts 72 are arranged in lateral alignment with each other and respectively join the floor 61 and the roof 64; and likewise, the pair of posts 73 are arranged in lateral alignment with each other and respectively join the floor 61 and the roof 64. A pair of laterally aligned upstanding posts 74 are arranged rearwardly of the posts 72 and at the opposite sides of the floor 61, the posts 74 respectively joining the floor 61 and the roof 64; and a pair of laterally aligned upstanding posts 75 are arranged forwardly of the posts 73 at the opposite sides of the floor 61, the posts 75 respectively joining the floor 61 and the roof 64. The posts 72, 74, 75 and 73 on each side of the floor 61 are arranged in substantially equally spaced-apart relation, the spacing between the pairs of posts 72–74, 74–75, and 75–73 being about 35 feet; whereby three pairs of longitudinally spaced-apart doorways are thus formed in each side of the body 60. Also, the central portion of the floor 61 disposed between the partition walls 67 and 69 and accessible to the three pairs of doorways in the sides of the body 60 has a length of about 110 feet and a width of about 23 feet. This central portion of the floor 61 constitutes a supporting and storage area including three sections for passenger automobiles, indicated at 80 in FIGS. 2, 3, 4 and 5.

Specifically, four of the passenger automobiles 80 may be conveniently stored in each of the three storage sections of the central portion of the floor 61, the four passenger automobiles in each storage section being arranged in side-by-side relation with each other and extending laterally of the floor 61. Moreover, the confronting aligned doorways at the opposite sides of each storage section readily accommodate simultaneous loading and unloading of the four passenger automobiles at each toll plaza 20, as explained more fully hereinafter. In each of the storage sections, two pairs of wheel guides 76 are rigidly secured to the floor 61, so as to insure parking of the passenger automobiles 80 in their storage positions alternately with relatively wide and relatively narrow laterally extending spaces therebetween, as best shown in FIGS. 3 and 4. This arrangement enforces an economical use of each storage section by the four passenger automobiles 80 therein, while preserving adequate spacing between each two adjacent passenger automobiles 80 to accommodate complete opening of the doors on one side of each of the passenger automobiles 80. Also, the width of the floor 61 is adequate to provide a passenger aisle adjacent to one side of the floor 61, when the passenger automobiles 80 are stored or parked on the floor 61 with respective ends thereof located closely adjacent to the other side of the floor 61, as shown in FIG. 4. This arrangement insures that the passengers of the passenger automobiles 80 have access to their automobiles 80, to the passenger lounge 68 and to the rest rooms 70 and 71 at all times during the transit of the motor car 50.

Figure 6:
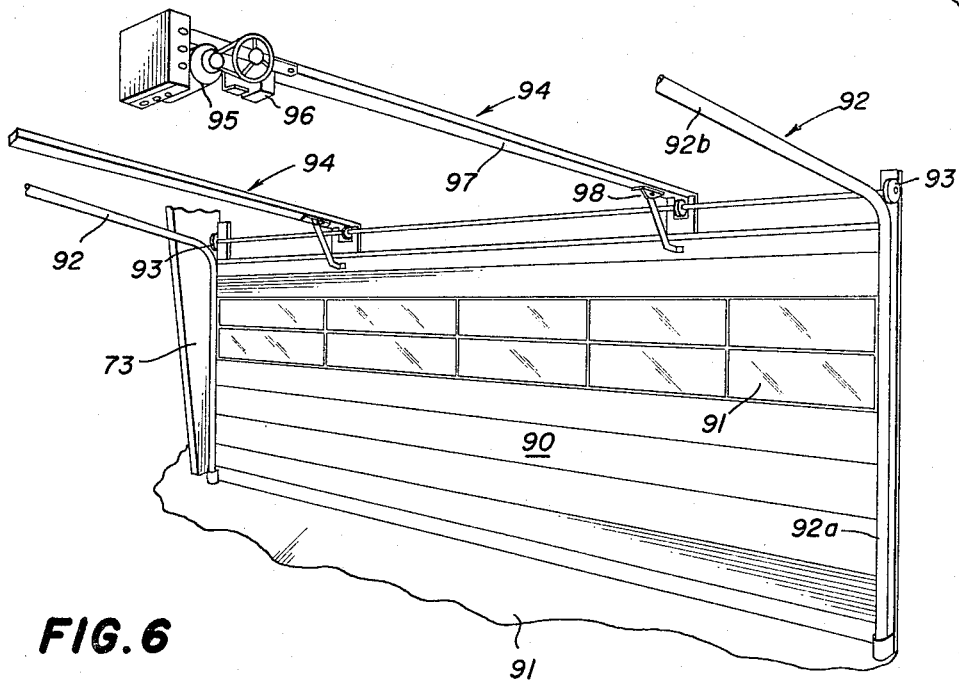
FIG. 6 is a greatly enlarged fragmentary inside perspective view of the arrangement for mounting each side door incorporated in the car, as shown in FIGS. 3, 4 and 5.

As best shown in FIGS. 4 to 6, inclusive, the three pairs of side doorways into the opposite sides of the body 60 are provided with three pairs of side doors 90, each of the overhead suspension type. Specifically, each of the side doors 90 includes a number of panels suitably hinged together at the adjacent abutting edges thereof, so that the side door 90 may be readily moved between open and closed positions with respect to the associated side doorway. In its closed position, each side door 90 occupies an upstanding position disposed in the associated doorway, as shown in solid lines in FIG. 5; and in its open position, each side door 90 occupies a substantially horizontal position disposed adjacent to and below the roof 64, as shown in broken lines in FIG. 5. In each side door 90, at least one of the panels is formed principally of glass, as indicated at 91 in FIG. 6, so that the passengers in the adjacent passenger aisle may view the exterior, as indicated in FIG. 5. There is ample room for the doors 90 in their open positions arranged adjacent to and below the roof 64, since the vertical distance between the top of the floor 61 and central interior surface of the roof 64 is approximately 8 feet.

Preferably, each side door 90 is of a conventional construction, whereby it is mounted for movements between its closed and open positions upon a pair of longitudinally spaced-apart track members 92, each of substantially L-shape. Each of the track members 92 includes a lower section 92a disposed adjacent to one of the posts 73, etc., in the associated side doorway, and an upper section 92b located below the adjacent interior portion of the roof 64, as best shown in FIG. 6. Also, the side door 90 carries rollers 93 that engage the track members 92, so as to accommodate rolling guided movements of the side door 90 upon the track members 92 and between its open and closed positions. For the purpose of moving the side door 90 between its open and closed positions, a pair of laterally extending and longitudinally spaced-apart operating mechanisms 94 are operatively connected between the roof 64 and the side door 90. Each of the operating mechanisms 94 is of conventional construction and arrangement, including an electric drive motor 95, gear mechanism 96, chain mechanism, not shown, housed in an elongated laterally extending casing 97, and a bracket 98 connected to the top panel of the side door 90. When the two electric motors 95 are energized in one direction, the two operating mechanisms 94 are actuated to move the side door 90 from its closed position into its open position; and when the two electric motors 95 are energized in the opposite direction, the two operating mechanisms 94 are actuated to move the side door 90 from its open position back into its closed position.

In the construction of the body 60, the number of pairs of side doorways provided in the opposite sides thereof is not critical, but each such side doorway therein should have a width of at least about 16 feet, and preferably of about 30 feet. Thus, the number of pairs of posts 74, 75, etc., disposed between the pair of front posts 72 and the pair of rear posts 73 is selected depending upon the desired width of the side doorways, as will be immediately apparent from an inspection of FIGS. 3 and 4.

The left-hand side of the front end of the roof 64 carries a laterally extending pantograph 99 that is movable in the vertical direction and that carries a contact shoe 100 that slides below and in contact with the associated overhead electric power supply system 16 when the motor car 50 is running on the track 11, and that slides below and in contact with the associated overhead electric power supply system 17 when the motor car 50 is running on the track 12.

The details of the electric power supply system for the motor cars 50 form no part of the present invention, and the same may be of any suitable conventional arrangement. For example, electric power substations, not shown, may be arranged along the right-of-way 10, and operatively connected to the overhead power supply systems 16 and 17, so as to impress a voltage of 22,000 volts, single phase, 60-cycles, A.C., between the overhead supply systems 16 and 17 and one rail of each of the tracks 11 and 12. Each of the motor cars 50 may comprise an electric power system, not shown, including a step-down transformer having a primary winding connected between the pantograph shoe 100 and the wheels 54 of the bogies 52, thereby to provide a power supply connection between the overhead system 16 or 17 and one rail of the track 11 or 12. Also, the transformer mentioned includes a secondary winding that is connected to the input terminals of a power rectifier that is operative to produce a voltage of 750 volts, D.-C., at its output terminals; which D.-C. power is selectively connected via grid resistors by a controller to the three traction motors 53 of each bogie 52. Each of the traction motors 53 may be of the compound D.-C. type, so that it is operative over a substantial voltage range from about 250 volts D.-C. to about 750 volts D.-C., and so that by shunt field control thereof the speed thereof may be varied from 0 to 1500 r.p.m., the torque of each traction motor 53 being applied by associated gearing, not shown, to the associated axle; whereby the motor car 50 may be driven or propelled by the three traction motors 53 in each of the two bogies 52 at any desired speed from 0 to about 200 m.p.h. Of course, the controller for the traction motors 53 may be selectively governed in any conventional manner, and the same accommodates both forward and reverse running of the traction motors 53 for the usual forward and reverse propulsion of the motor car 50. Further, the control arrangement incorporated in each motor car 50 accommodates operation thereof as a single unit or as a coupled train of the motor cars 50, as indicated in FIGS. 1 and 2. Of course, in the coupled train of motor cars 50, the control apparatus in the leading unit exercises control over all of the trailing units; whereby the train is propelled by the three electric traction motors 53 in each of the two bogies 52 in each of the coupled units, in the usual manner.

Again referring to FIG. 2 each of the toll plazas 20 may be substantially identical; whereby the toll plaza 20 there illustrated comprises a pair of platforms 21 and 22 respectively disposed on opposite sides of one of the tracks 11, and a pair of toll platforms, not shown, respectively disposed on the opposite sides of the track 12, not shown, at the toll plaza 20. Thus, the two platforms 21 and 22 are employed only for handling traffic from the metropolitan area "A" to the metropolitan area "B," not shown; while the other two platforms, not shown, are employed only for handling traffic from the metropolitan area "B," not shown, to the metropolitan area "A."

These two sections of the toll plaza 20 are identical; whereby the further description of the system will be confined to the illustrated section of the toll plaza 20. Specifically, the two platforms 21 and 22 are disposed in a common horizontal plane corresponding to that of the floor 61 of any one of the motor coaches 50 that may be stopped at the toll plaza 20 and running on the section of the track 11 that is operatively associated with the platforms 21 and 22. Also, the ends of the platforms 21 and 22 are disposed substantially parallel to each other and respectively adjacent to the opposite sides of the floor 61 of a motor car 50 that is stopped at this section of the toll plaza 20; whereby the passenger automobiles 80 may be selectively loaded and unloaded between the floor 61 and the two platforms 21 and 22 merely by driving the passenger automobiles 80 from the platforms 21 and 22 onto the floor 61, or from the floor 61 onto the platforms 21 and 22, when the side doors 90 carried by the opposite sides of the body 60 occupy their open positions.

For the purpose of correlating the loading and unloading operation the platforms 21 and 22 may be each provided with a plurality of traffic lanes disposed in parallel relation with each other and substantially normal to the section of the track 11 cooperating with the platforms 21 and 22. For example, the platform 21 may comprise the single lane 21a, the five double lanes 21b, 21c, 21d, 21e and 21f, and the single lane 21g; which lanes 21a, etc., are arranged in coordinate relation and alignment with corresponding lanes provided on the platform 22; and which lanes mentioned accommodate the complete loading or unloading of twelve passenger automobiles 80 between the platforms 21 and 22 and one of the motor cars 50. As illustrated, the platforms 21 and 22 may comprise additional traffic lanes for the simultaneous loading and unloading of a second of the motor cars 50 in the coupled train. Further, the traffic lanes 21b, 21c, etc., comprise individual toll ticket dispensing machines 23b, 23c, etc., that are adapted to receive toll fares and to issue toll tickets to drivers of the passenger automobiles 80. Furthermore, toll gates 24b, 24c, etc., are operatively associated with the traffic lanes 21b, 21c, etc., which toll gates 21b, 21c, etc., are respectively controlled by the corresponding toll ticket dispensing machines 23b, 23c, etc.; and which toll gates 24b, 24c, etc., actually govern the movement of the passenger automobiles 80 therethrough and onto the floor 61 of the motor car 50 in its coordinate stop position at the toll plaza 20. Of course, the traffic lanes mentioned on the platforms 21 and 22 are connected to highways, not shown, via suitable road links, not shown, so that the passenger automobiles 80 may readily move between the platforms 21 and 22 and the highways mentioned.

The toll gates 24b, 24c, etc., control loading of the passenger automobiles 80 from the platform 21 so that the passenger automobiles 80 are loaded in the odd storage positions on the floor 61 and are thus directed toward the side door 90 positioned on the right-side of the railway motor car 50, as shown in FIGS. 3 and 4. On the other hand, the corresponding toll gates, not shown, control loading of the passenger automobiles 80 from the platform 22 so that the passenger automobiles 80 are loaded in the even storage positions on the floor 61 and are thus directed toward the side door 90 positioned on the left-hand side of the railway motor car 50, as shown in FIGS. 3 and 4. Accordingly, the two groups of toll gates respectively arranged on the platforms 21 and 22 at the toll plaza 20, as shown in FIG. 2, cooperate to enforce orderly and predetermined loading movements of the passenger automobiles 80 from the two platforms 21 and 22 onto the floor 61, simultaneously and without interference with each other.

Considering now the overall operation of the combination railway and passenger automobile transportation system, a person, with his passangers, may drive his passenger automobile 80 from his home in the vicinity of the metropolitan area "A" to the toll plaza 20 and onto the platform 21 and into the traffic lane 21b. The driver then inserts the required coins into the toll ticket dispenser 23b and receives a toll ticket. Subsequently, when a train of the motor cars 50 enters the section of the track 11 at the toll plaza 20 and occupies its coordinate stop position thereof, the toll ticket dispenser 23b is governed, so as to effect operation of the toll gate 24b into its open position. At this time the side doors 90 of the motor car 50 occupy their open positions, whereby the person drives his passenger automobile 50 through the open toll gate 24b and thence onto the floor 61 of the motor car 50 and into a corresponding storage position on the floor 61. Shortly thereafter, the train is loaded and the side doors 90 of each motor car 50 are closed. The train then starts and runs at high speed to the toll plaza 20 near the metropolitan area "B," not shown. The train comes to a stop in its coordinate stop position; and the side doors 90 of each motor car 50 are opened; whereby the person drives his passenger automobile 80 from the floor 61 of the motor car 50 into a corresponding traffic lane on the associated platform. The person then drives his passenger automobile 80 along the traffic lane to the associated toll ticket dispensing machine and deposits his toll ticket therein. The toll ticket dispensing machine checks the deposited toll ticket and then actuates the associated toll gate into its open position, so that the person may then drive his passenger automobile 80 from the platform of the toll plaza and then onto the associated highway and ultimately to his destination in the metropolitan area "B." During the transit of the train between the two toll plazas, the person, and his passengers, have access to the facilities of the particular motor car 50 in which his passenger automobile 80 is stored.

Since the right-of-way 10 does not intersect at the same grade level any railway tracks or highways, the train may run the distance between the two toll plazas 20 at the two metropolitan areas "A" and "B" at an exceedingly high speed. Moreover, since the two toll plazas 20 mentioned accommodate rapid loading and unloading of the passenger automobiles 80, the overall schedule of the run may be maintained within very close time limits. Also, it is contemplated that a frequent schedule of trains will be maintained, and that each train will comprise one or more individual motor cars 50, as traffic conditions require. Also, since each of the motor cars 50 has a relatively low center of gravity due to the extremely wide gauge of the tracks 11 and 12, speeds as high as 200 m.p.h. may be readily obtained in long straight sections of the tracks 11 and 12 between the two metropolitan areas "A" and "B."

While the system has been described with reference to only the two main stations or toll plazas 20 at the two metropolitan areas "A" and "B," it will of course be understood that suitable waystations or auxiliary toll plazas may be provided between the two main stations in an obvious manner.

In view of the foregoing it is apparent that there has been provided a combination railway and passenger automobile transportation system, including an improved organization of apparatus and facilities, and involving a railway motor car of improved construction and arrangement, that greatly facilitates the transportation of both passenger automobiles and the passengers thereof.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A combination railway and passenger automobile transportation system comprising: a stretch of railway track having a wide gauge of at least 10 feet; a railway motor car adapted to run on said stretch of railway track and including an elongated longitudinally extending underframe supported adjacent to the opposite ends thereof by a pair of motor driven running gears having said wide track gauge named and engaging the rails of said track, a body carried by said underframe and having a substantially box-like configuration and including a substantially horizontal floor and a generally horizontal roof and a pair of upstanding end walls, the horizontal plane of said floor being disposed at least 40 inches above the rail heads of said track, said floor having a length of at least 100 feet and a width of at least 20 feet, a first plurality of longitudinally spaced-apart upstanding posts arranged at one open side of said body and joining said floor and said roof, a second plurality of longitudinally spaced-apart upstanding posts arranged at the other open side of said body and joining said floor and said roof, said posts being arranged in coordinate laterally aligned pairs so as to provide a plurality of coordinate laterally aligned confronting doorways in the opposite sides of said body, whereby a passenger automobile may be driven onto or off of said floor through either of the two laterally aligned confronting doorways of any coordinate pair, each of said doorways having a width between the adjacent pair of said posts to accommodate the simultaneous loading or unloading therethrough of at least two passenger automobiles disposed in side-by-side relation with each other, the dimensions of said floor accommodating the simultaneous support and storage thereupon of a substantial number of passenger automobiles extending laterally thereof and disposed in side-by-side relation with each other, a plurality of doors respectively associated with said doorways and selectively movable between open and closed positions with respect thereto, and motor means for selectively moving said doors between their open and closed positions; and a toll plaza including a pair of platforms respectively disposed on opposite sides of a section of said track and positioned substantially in the horizontal plane of said floor when said railway motor car occupies a coordinate stop position in said section of said track, the confronting edges of said platforms being disposed substantially parallel to each other and spaced-apart by a distance that is only slightly greater than the width of said floor, whereby a passenger automobile on either one of said platforms may be driven directly onto said floor when said railway motor car occupies its coordinate stop position at said toll plaza, and whereby a passenger automobile occupying a loaded position on said floor may be driven directly onto either one of said platforms when said railway motor car occupies its coordinate stop position at said toll plaza.

2. The combination railway and passenger automobile transportation system set forth in claim 1, wherein said two platforms have two groups of traffic lanes respectively arranged thereon with the individual traffic lanes in each group disposed in adjacent parallel relation with each other and with the respective ends of the two groups of traffic lanes disposed substantially normal to said section of said track and in coordinate end-to-end alignment with each other, whereby a plurality of passenger automobiles respectively occupying the traffic lanes on either one of said platforms may be driven simultaneously directly onto said floor when said railway motor car occupies its coordinate stop position at said toll plaza, and whereby a plurality of passenger automobiles respectively occupying loaded positions on the floor of said railway motor car may be driven simultaneously directly onto the traffic lanes on either one of said platforms when said railway motor car occupies its coordinate stop position at said toll plaza.

3. The combination railway and passenger automobile transportation system set forth in claim 2, and further comprising two traffic control arrangements respectively operatively associated with the two groups of traffic lanes respectively arranged on said two platforms, said two traffic control arrangements being related with respect to each other to enforce an orderly and predetermined movement of the two groups of passenger automobiles respectively occupying the two groups of traffic lanes respectively arranged on said two platforms and onto said floor when said railway motor car occupies its coordinate stop position at said toll plaza.

4. The combination railway and passenger automobile transportation system set forth in claim 3, wherein said floor comprises a predetermined number of storage positions, and said two traffic control arrangements enforce the loading of the passenger automobiles from one of said platforms into vacant odd ones of the storage positions on said floor and enforce the loading of the passenger automobiles from the other of said platforms into vacant even ones of the storage positions on said floor.

5. The transportation system set forth in claim 1, wherein said wide track gauge is approximately 17 feet.

6. The transportation system set forth in claim 1, wherein said floor has a width of approximately 23 feet.

7. The transportation system set forth in claim 1, wherein each of said doorways has a width in the general range 16 feet to 35 feet.

8. The transportation system set forth in claim 1, wherein each of said running gears is in the form of a multi-axle bogie.

9. The transportation system set forth in claim 1, wherein the one of said end walls disposed at the front end of said body includes substantial transparent wall structure serving as a window, and said body further comprises partition structure arranged rearwardly of said one end wall and extending between said floor and said roof and cooperating therewith to define a passenger compartment in the extreme front end of said body.

10. The transportation system set forth in claim 1, wherein the interior height of said body between the top of said floor and the bottom of said roof is not more than approximately ½ of the width of said floor.

11. The transportation system set forth in claim 1, wherein there are at least three of said doorways on each side of said body.

12. The transportation system set forth in claim 1, wherein each of said doors is of the overhead suspension type, whereby each of said doors in its closed position is arranged in an upstanding attitude in the associated one of said doorways, and whereby each of said doors in its open position is arranged in a substantially horizontal attitude adjacent to and below said roof.

13. The transportation system set forth in claim 1, wherein the width of said floor also affords an elongated passenger aisle in said body and extending longitudinally between the opposite ends of said floor and disposed adjacent to one side thereof when the supported passenger automobiles are arranged with respective ends thereof disposed closely adjacent to the other side of said floor.

References Cited by the Examiner

UNITED STATES PATENTS

| | | | |
|---|---|---|---|
| 295,014 | 3/1884 | Hunter et al. | 61—67 |
| 428,385 | 5/1890 | Emery | 104—28 |
| 861,328 | 7/1907 | Stirring | 105—159 |
| 1,174,400 | 3/1916 | Drum | 104—28 |
| 1,884,687 | 10/1932 | Hilpert | 104—35 |
| 1,978,080 | 10/1934 | Giger | 105—49 |
| 2,146,436 | 2/1939 | Lima. | |
| 2,211,469 | 8/1940 | King | 105—340 |
| 2,419,498 | 4/1947 | Newton | 105—327 |
| 2,524,260 | 10/1950 | Hutson | 105—340 |
| 2,766,703 | 10/1956 | Cooke | 105—133 |
| 2,844,106 | 7/1958 | Miers et al. | 105—3 |
| 3,012,520 | 12/1961 | Curtis | 104—235 |
| 3,101,677 | 8/1963 | Ehinger | 104—91 |

FOREIGN PATENTS

| | | |
|---|---|---|
| 1,274,220 | 9/1961 | France. |
| 499,930 | 11/1954 | Italy. |

OTHER REFERENCES

The Gauge Question by Wyndham Harding; second edition (page 2 relied on).

ARTHUR L. LA POINT, *Primary Examiner.*

LEO QUACKENBUSH, *Examiner.*

F. W. MONAGHAN, *Assistant Examiner.*